Sept. 3, 1963  E. W. WEITZEL ETAL  3,102,715
CORDAGE PRODUCT FOR INSTALLING ELECTRICAL
CONDUCTORS IN CONDUITS
Filed Aug. 23, 1961  2 Sheets-Sheet 1
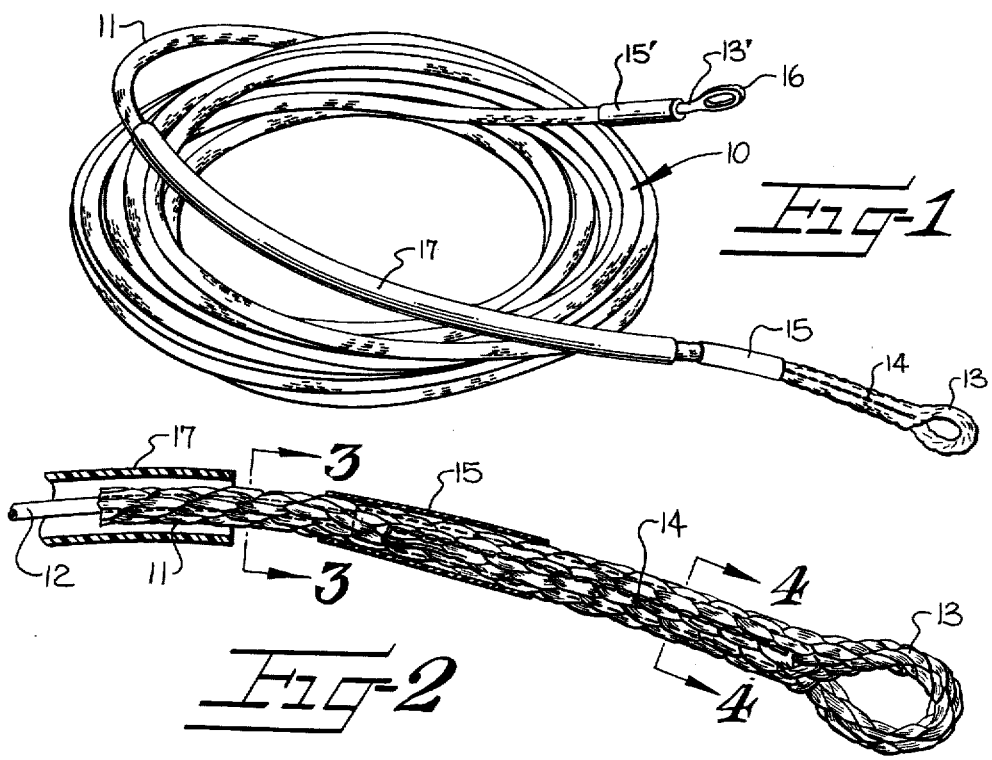
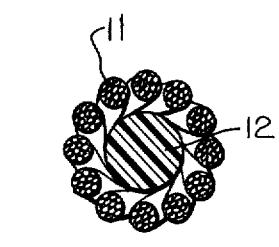
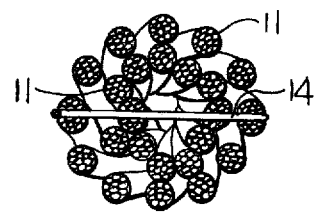
INVENTORS:
EDWARD W. WEITZEL
and JAMES C. HAMRICK
BY Eaton, Bell, Hunt & Sulfer
ATTORNEYS Sept. 3, 1963                   E. W. WEITZEL ETAL                 3,102,715
                         CORDAGE PRODUCT FOR INSTALLING ELECTRICAL
                                 CONDUCTORS IN CONDUITS
Filed Aug. 23, 1961                                              2 Sheets-Sheet 2

United States Patent Office 3,102,715
Patented Sept. 3, 1963

3,102,715
CORDAGE PRODUCT FOR INSTALLING ELECTRICAL CONDUCTORS IN CONDUITS
Edward W. Weitzel, Hickory, and James C. Hamrick, Charlotte, N.C., assignors to Jet Line Products, Inc., Matthews, N.C., a corporation of North Carolina, and Shuford Mills, Inc., Hickory, N.C., a corporation of North Carolina
Filed Aug. 23, 1961, Ser. No. 133,412
4 Claims. (Cl. 254—134.3)

This invention relates to an elongated non-metallic cordage product for installing electrical conductors or other elongated relatively stiff articles in conduits by utilizing the non-metallic cordage product as a guide line.

Heretofore, various means have been utilized for installing electrical conductors in conduits, the device most frequently employed in the past comprising a metallic "fish tape" or "snake wire" which may be made from a flattened strip of spring steel material or may be formed of braided metal strands. In practice, such fish tapes or snake wires are pushed through a conduit preparatory to attaching either a guide line or an electrical conductor to the trailing end of the fish tape, after which the guide line or the electrical conductor is pulled through the conduit by means of the fish tape.

Metallic fish tapes of the type described above have proven unsatisfactory in many cases in that their inherent spring-like characteristics render them difficult to control, since they tend to uncoil and assume an unmanageable mass preparatory to being inserted into the conduit. Still another disadvantage of this type of fish tape is the difficulty in grasping it following its passage through a conduit, the metallic nature of the fish tape being such as to readily cut the hands of the operator and to render it difficult to grasp.

Still another disadvantage of the metallic fish tapes or snake wires heretofore in use is the danger of shorting or shocking caused by contact with hot boxes or exposed electrically charged members. Because of the tendency of metallic fish tapes or snake wires to cut the hands of the operator and the difficulty in grasping such a tape, resort is frequently made to the use of pliers to grasp the fish tape. This is objectionable in that the pliers tend to kink and cut into the fish tape thereby rendering it unsatisfactory for further installation into conduits by roughening its surface.

It will be appreciated that the smoother the exterior surface of the fish tape or snake wire happens to be, the easier it will be to push it into a conduit preparatory to locating an electrical conductor therein. This brings to mind another objection to the metallic fish tape or snake wire heretofore in use in that such articles are prone to rust and the rusty surfaces create greater frictional drag on the interior surface of the conduit, thereby rendering them useless on long passages.

Still another disadvantage of the conventional metallic fish tapes or snake wires is their tendency to scratch and even cut soft metal conduits, such as those made from aluminum, and plastic conduits which are becoming more popular because of their light weight and ease of installation.

Despite these objections, metallic fish tapes or snake wires are in wirespread use as a means for introducing a guide line through a conduit because of the inability of strand, filamentous, or cordage products of non-metallic material to be inserted in a conduit for any appreciable length thereof prior to our invention. It has long been recognized that elongated non-metallic articles—such as ropes, cordage products, lines, etc. made of hemp material, jute, textile yarn, synthetic plastics, etc.—are not satisfactory substitutes for metallic fish tapes or snake wires in introducing a guide line through a conduit. These elongated non-metallic articles are known to be accompanied by properties such as limpness and pliability which prevent their introduction through any significant length of a conduit. Upon being inserted in one end of a conduit, such elongated non-metallic articles soon exhibit a tendency to bend backwardly upon themselves and to accumulate in a wad within the conduit to block the passage therethrough without traversing any appreciable length of the conduit and have been discarded as a practical substitute for a metallic fish tape or snake wire in the particular environment herein described.

Attempts have been made to overcome the foregoing objections of metallic fish tapes or snake wires, such as shown in Patent No. 2,750,152, issued June 12, 1956 to William G. Schinske. Patent No. 2,750,152 discloses a plastic sheath or sleeve over the major portion of the metallic fish tape, the sleeve or sheath being provided as insulation. The plastic sheath is also said to resist rusting of the metallic fish tape.

The provision of the plastic sheath is not a complete answer to the difficulties encountered in the use of metallic fish tapes as pointed out above. The shortcoming in the plastic sheath is the possibility of it becoming ruptured or broken, thereby exposing the metallic core to electrically charged members creating danger of shock to the operator or causing a short circuit.

More importantly, the plastic covered metallic fish tape of Patent No. 2,750,152 and the other metallic fish tapes or snake wires of the prior art are inherently deficient in that metallic fish tapes do not possess all of the physical characteristics which would be desirable in a device for facilitating the location of electrical conductors within conduits. Ideally, a device to be utilized as a guide line for installing electrical conductors or other relatively stiff elongated articles within existing conduits should possess as many of the following characteristics as possible:

(1) A blend of flexibility and rigidity enabling the guide line to negotiate repeated bends and angles throughout the length of a conduit without binding therein or bending backwardly upon itself.

(2) A high elastic limit and a high elastic recovery factor which will permit the guide line to be readily tied in a figure-of-eight or overhand knot for ease in grasping. The requisite flexure-rigidity blend which permits the guide line to be passed through the conduit and about bends without doubling upon itself also enables the knot in the line to be readily untied when desired without undue effort.

(3) A high degree of toughness, as opposed to a brittle quality, enabling the guide line to withstand stresses and strains imparted thereto by temporary distortion of the guide line.

(4) A high resistance to the fatigue factor enabling the guide line to withstand repeated flexing.

(5) A sufficiently smooth external surface having a low coefficient of friction to minimize the frictional drag of the guide line against the internal surface of the conduit, and (6) A poor memory characteristic allowing the guide line to readily conform to the shape of the conduit as it passes therethrough and eliminating any tendency of the guide line to kink while in the conduit. The guide line is thereby enabled to retain a temporary set conforming to the shape of the conduit in which it is inserted, but can be restored to a straightened condition with ease because of its high elastic recovery factor.

It has been found that all of the foregoing physical properties can be embodied in a line or tape which has the additional advantage of being non-metallic and therefore not subject to conductivity of electrical currents nor to the abrasive action against aluminum and plastic conduits which is characteristic of metallic fish tapes heretofore in use.

It is therefore a primary object of this invention to provide a guide line possessing the foregoing physical properties and comprising a plastic core and a jacket or sleeve formed from braided plastic strands.

It is another object of this invention to provide a guide line in the form of a non-metallic cordage product for introduction through a conduit to thereafter draw bulky electrical conductors or other lengthy elements into the conduit for installation therein, wherein the cordage product is constructed so as to possess a flexure-rigidity blend of properties peculiar in an elongated non-metallic article to allow the cordage product to be inserted through the length of a conduit without binding therein or bending backwardly upon itself. The non-metallic guide line is highly resistant to fatigue and is further characterized by excellent adaptability or conformability to the shape of a conduit through which it is inserted to materially reduce the force of its frictional contact with the conduit, complemented by substantially complete elastic recovery from the kinks and bends imparted therein on its journey through the conduit following its withdrawal from the conduit.

It is another object of this invention to provide a guide line in the form of a non-metallic cordage product comprising an outer flexible braided jacketed having a relatively high tensile strength and a low coefficient of friction, and a core extending through the jacket for imparting relative rigidity to the cordage product, with the braided jacket and the core combining to produce a flexure-rigidity blend of properties in the cordage product peculiar in an elongated non-metallic article enabling it to be inserted through a conduit for thereafter drawing an electrical conductor or the like into the conduit.

Some of the objects of the invention having been stated, other objects will appear as the description proceeds when taken in connection with the accompanying drawings, in which—

FIGURE 1 is a perspective view of a non-metallic cordage product constructed in accordance with the present invention with opposite ends of the cordage product illustrating different forms of loop means which may be arranged thereon, and showing an entrance adaptor tube mounted on the cordage product to facilitate insertion of the cordage product in an end of a conduit;

FIGURE 2 is an enlarged fragmentary elevational view of one end of the cordage product illustrated in FIGURE 1 and showing the loop formed therein, parts being shown in section and partially broken away to clarify the internal construction of the cordage product;

FIGURE 3 is a greatly enlarged transverse sectional view of the cordage product taken along the line 3—3 in FIGURE 2;

FIGURE 4 is a greatly enlarged transverse sectional view of the cordage product taken along the line 4—4 in FIGURE 2;

Figure 6:
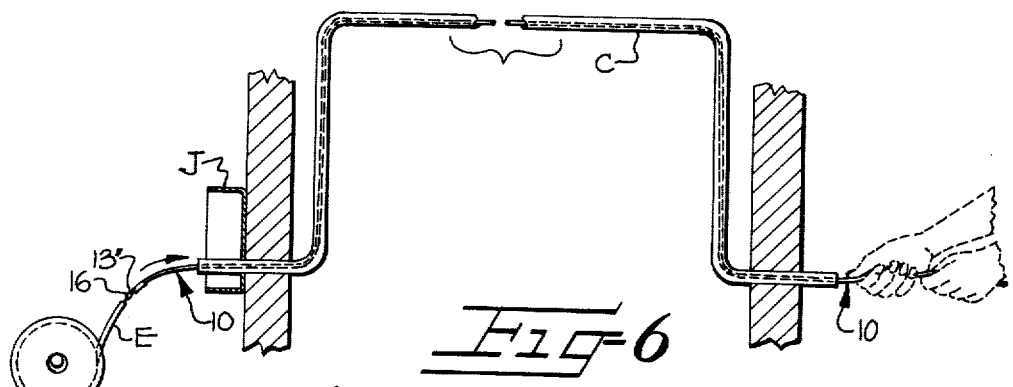
Figure 7:
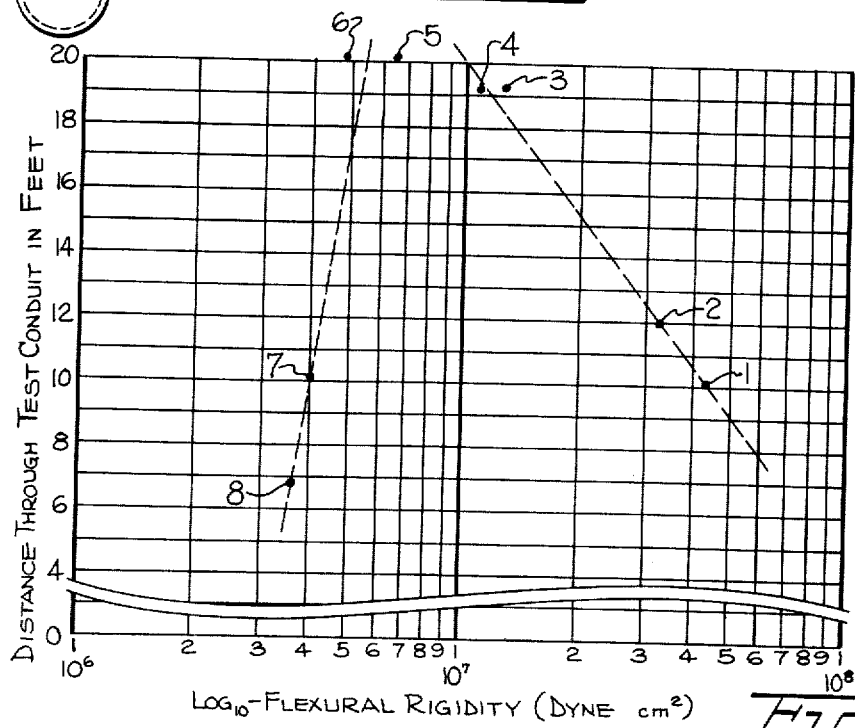

FIGURE 6 is a fragmentary schematic view showing the introduction of the cordage product through the length of the conduit with the end of the cordage product protruding from the opposite end of the conduit in which the cordage product was inserted being pulled to draw a comparatively stiff electrical conductor attached to the trailing end of the cordage product into the conduit; and FIGURE 7 is a graphical representation comparing test results obtained in using various forms of non-metallic cordage products found to be suitable and unsuitable for use as a guide line to be introduced through a conduit with test results obtained from the use of a comparable fish tape or snake wire.

Referring more specifically to the drawings, the cordage product, as constructed in accordance with the present invention and hereinafter referred to as conduit cordage, is broadly designated by the reference numeral 10. The conduit cordage 10 comprises an outermost covering in the form of a plurality of abrasive-resistant thermoplastic strands possessing a relatively high tensile strength and low coefficient of friction, the strands being braided into an elongated tubular jacket 11 affording substantial flexibility and pliability which can be controlled to some extent through the size of the stitch construction employed in braiding the thermoplastic strands together. In the latter respect, as the individual stitches in the outer braided tubular jacket 11 are reduced in size, relatively more rigidity is imparted to the jacket 11 and its flexibility and pliability are correspondingly reduced. While it should be understood that the jacket 11 may be braided from any suitable thermoplastic strand material having a relatively high tensile strength plus a low coefficient of friction within the spirit of this invention, it is preferred to use strands of high tenacity polyethylene having uniformly smooth, slick surfaces for this purpose.

A rod or core 12 shown in FIGURE 3 as having a circular cross-section extends through the tubular braided jacket 11. The rod 12 is made of a thermoplastic material exhibiting considerable toughness, preferably coming from the polyolefin resins, polyvinyl resins, and polyamides. Among the thermoplastic materials found to be suitable for the composition of the rod 12 are included polyethylene, polypropylene, polyvinyl chloride and nylon. The rod 12, although possessing sufficient flexibility to be tied in a tight overhand or figure-of-eight knot without undergoing permanent distortion is sufficiently stiff to impart longitudinal rigidity to the conduit cordage 10 as to withstand buckling or doubling back on itself while retaining enough flexibility for permitting the conduit cordage 10 to negotiate sharp angular bends in a conduit without being permanently distorted. The inner core 12 is preferably of uniform cross-sectional dimensions and is centrally disposed within the outer braided tubular jacket 11 in unbonded relationship with respect thereto.

One end of the conduit cordage 10 is provided with a loop 13 which may be formed thereon in the following manner. As noted in FIGURE 2 by the phantom lines designating one end of the rod or inner core 12, the corresponding end of the tubular jacket 11 extends beyond the core 12 and is turned backwardly upon itself to form the loop 13 with the free end of the jacket 11 being tucked within the interior of the remaining portion of jacket 11 extending beyond the core 12. In this instance, the free end of the jacket 11 is forced between adjacent strands forming a stitch in the braided construction of the jacket 11 and fed within the interior of the jacket 11 to a position adjacent the end of the core 12, as indicated by the phantom lines in FIGURE 2. Stitches 14 extend through the portion of the jacket 11 receiving the inturned free end thereof to secure the inturned free end therewithin, thereby preventing the free end from slipping outwardly of the tubular passageway in the jacket 11 in which it is confined.

A band 15 of suitable fabric or plastic film having an adhesive coating on one surface is adhesively bound about the jacket 11 in a tight girdling relationship to reinforce the conduit cordage 10 in the region where the inturned free end of the jacket 11 and the end of the inner core 12 meet so as to prevent the core 12 from protruding through the braided construction of the jacket 11 when flexing or bending of the conduit cordage 10 occurs.

It is contemplated that a loop similar to the loop 13 may be formed on the opposite end of the conduit cordage 10, or an alternative loop construction 13', as shown in FIGURE 1, may be provided. The loop 13' comprises a sleeve of thermoplastic material 15' surrounding the opposite end portion of the conduit cordage 10 with a portion of the braided jacket 11 extending beyond the inner core 12 being therewithin and clamped in sandwiched relationship by some form of tubular ferrule (not shown) fitted within the portion of the jacket 11 and into which an eye element 16 of suitable material, such as metal or plastic, may be threaded to complete the construction of loop 13'. In some instances, it may be desirable to provide the conduit cordage 10 with a loop at only one end thereof, in which case, the end of the conduit cordage 10 opposite from the loop may be heat-sealed (not shown) or otherwise treated to prevent unraveling of the braided jacket 11.

To facilitate the insertion of the conduit cordage 10 into the end of a conduit for introduction as a guide line therethrough, especially in instances where the end of the conduit may be relatively inaccessible as when located in or around a junction box, a highly flexible entrance adaptor in the form of an elongate tubular sleeve 17 of suitable non-conductive material loosely encircles the conduit cordage 10 at a location adjacent the leading end thereof to be inserted in the conduit. While in the particular illustration of the conduit cordage 10 shown in FIGURE 1, the entrance adaptor sleeve 17 is shown adjacent the loop 13, where the conduit into which the conduit cordage 10 is to be introduced has a relatively small diameter, it will be understood that the leading end of the conduit cordage 10 may have no loop so as to eliminate the possibility of obstruction caused by a loop, thereby facilitating passage of the conduit cordage 10 through the conduit.

Figure 5:
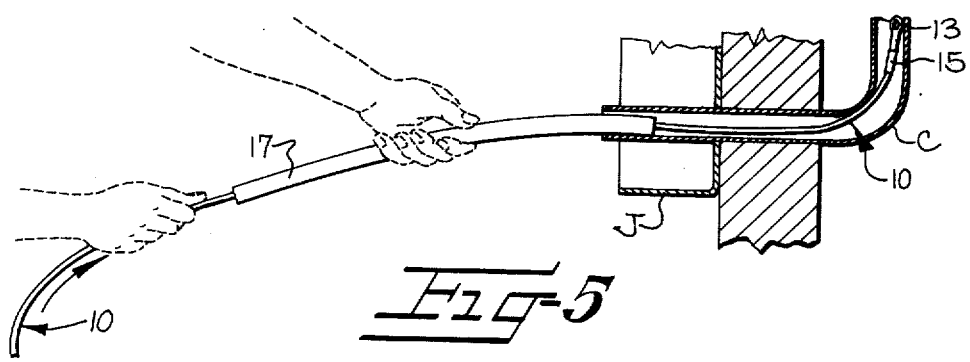
FIGURE 5 is a fragmentary schematic view showing the insertion of the cordage product in one end of a conduit protruding from a junction box utilizing the entrance adaptor tube of FIGURE 1.

Referring to FIGURES 5 and 6, there is schematically illustrated a conduit C through which a guide line is to be introduced for the purpose of drawing a comparatively stiff electrical conductor E into the conduit C for installation therein. The end of the conduit C into which the guide line must be introduced protrudes from a junction box J and space for manipulation of the guide line to be introduced into the conduit C is limited. In utilizing the conduit cordage 10 herein described, an operator first slides the entrance adaptor sleeve 17 along the conduit cordage 10 until the entrance adaptor sleeve 17 extends outwardly of the leading end thereof. The entrance adaptor sleeve 17 is then inserted in the end of the conduit C and flexed into a comfortable position for feeding the conduit cordage 10 therethrough and into the conduit C. As shown in FIGURE 5, the entrance adaptor sleeve 17 has been arranged within the end of the conduit C protruding from the junction box J, and the conduit cordage 10 is being fed through the entrance adaptor sleeve 17 and into the conduit C. When the conduit cordage 10 has been inserted through the length of the conduit C, the loop on its trailing end protruding from the end of the conduit C through which the conduit cordage 10 was introduced is attached to an end of the comparatively stiff electrical conductor E. The operator then grasps the leading end of the conduit cordage 10 protruding from the opposite end of the conduit C, as shown in FIGURE 6, and by pulling the conduit cordage 10 outwardly of the conduit C draws the electrical conductor E into the conduit C for installation therein. To facilitate the gripping and pulling of the conduit cordage 10, a figure-of-eight or overhand knot may be tied in its leading end prior to the pulling operation to substantially eliminate slipping of the conduit cordage 10 in the hand.

In introducing a guide line through a conduit as just described, the non-metallic conduit cordage 10, because of its capacity to deform or change shape conforms to the shape of a conduit into which it is inserted, as the conduit cordage 10 is fed thereinto. This characteristic is abetted by a flexure-rigidity blend of properties peculiar in an elongated non-metallic article—imparting of a degree of elongate rigidity to the conduit cordage 10 by the inner rod or core 12 thereof to prevent kinking and backward bending of the conduit cordage 10 within the conduit being complemented by flexing of the outer braided jacket 11 and inner core 12 as necessary to conform the conduit cordage 10 to irregularities in the conduit, such as angular bends, as the conduit cordage 10 proceeds through the conduit.

Even though elongated non-metallic articles of strand, filament, or cordage type have been thought to be unsuitable for the purpose of serving as a guide line which can be introduced through a conduit of relatively long length and/or having one or more angular bends therein because of the pronounced tendency of such elongated non-metallic articles to bend backwardly on themselves and to accumulate in a wad in the conduit without passing through any appreciable length thereof, we have determined that a non-metallic cordage product having a flexural rigidity or a flexure-rigidity blend of properties peculiar in an elongated non-metallic article of the type described—complemented by the characteristics of high fatigue resistance, and excellent conformability to the shape of conduits through which the non-metallic cordage product is inserted coupled with a high degree of elastic recovery from deformations imparted therein because of its excellent conformability—is capable of results superior to a comparable fish tape or snake wire when used as a guide line to be introduced through a conduit.

In making our determination, it was first observed that the modulus of elasticity in flexure of the core material in an elongated cordage product could be made to be the determining factor in establishing the flexural rigidity of the cordage product by varying only: (1) the modulus of elasticity in flexure (changing the core material) and (2) the diameter of the core, while maintaining all other factors constant in making test samples of elongated cordage products having a range of flexural rigidities for comparison purposes. The flexural rigidity or bending rigidity of an elongated article in accordance with the present invention, is defined by the following formula:

$$\text{Flexural rigidity} = \frac{Pl^3}{3y}$$

where:

$P$ = Force applied at a distance $l$ from the point of support of a horizontal cantilever, and
$y$ = deflection of a cantilever at point of application of force.

In calculating the flexural rigidity of the samples, each of the samples was anchored at one end and extended horizontally in space from the anchor point. A weight was then applied against the sample at a distance from the anchor point and the resulting deflection of the sample at the point of application of the weight was measured, whereupon the flexural rigidity of the sample was determined from the previously stated formula.

Samples of non-metallic cordage products having different core materials and diameters offering a comprehensive range of flexural rigidities as calculated from the formula after being examined under identical conditions were subjected to a comparison test along with a comparable spring steel fish tape or snake wire by inserting these samples and the snake wire in a ¾" diameter conduit having a plurality of angular bends therein offering extreme difficulties to the introduction of a guide line therethrough for measuring the distance that each sample could be pushed through this conduit.

The flexural rigidity and this distance that these samples could be pushed through the ¾" diameter test conduit are set forth below for the purpose of comparison:

| Sample | Core diameter, inches | Flexural rigidity (dyne cm.²) | Distance pushed through conduit |
| --- | --- | --- | --- |
| 1. Polyethylene core with wire center. | 0.140 | 4.36×10⁷ | 10 ft. 2 in. |
| 2. Steel "snake" wire | | 3.27×10⁷ | 12 ft. |
| 3. Polyvinyl chloride core | 0.160 | 1.31×10⁷ | 19 ft. 3 in. |
| 4. Polyethylene 3,300-80,005 core. | 0.160 | 1.09×10⁷ | 19 ft. 2 in. |
| 5. Polyvinyl chloride core | 0.120 | 6.5×10⁶ | 20 ft. 2 in. |
| 6. Polyvinyl chloride core | 0.100 | 4.9×10⁶ | 20 ft. 2 in. |
| 7. Polyethylene core with rayon center. | 0.154 | 4.09×10⁶ | 10 ft. 2 in. |
| 8. Folded polyethylene film core. | 0.120 | 3.64×10⁶ | 6 ft. 10 in. |

By plotting the flexural rigidity of each sample vs. the distance each sample could be pushed through the test conduit on a logarithmic scale to the base 10, the graphical comparison illustrated in FIGURE 7 is obtained which indicates that a range of flexural rigidities from $4.3 \times 10^6$ to $3.27 \times 10^7$ dyne cm.² in a non-metallic cordage product will produce results at least equal to those obtained from a comparable "snake" wire when inserted as a guide line through a conduit. Thus, it will be observed from the test data that samples 3, 4, 5, and 6 are non-metallic cordage products suitable for use as a conduit cordage which are substantially superior to a comparable snake wire as to the relative length each could be expected to be introduced through a given conduit before the frictional resistance encountered is developed to a degree preventing further introduction of such cordage products through the conduit. It will be observed that the approximate range of flexural rigidity values for the four superior cordage products lies between $4.9 \times 10^6$ and $1.31 \times 10^7$ dyne cm.² and for optimum results, it is preferred that a non-metallic conduit cordage product should exhibit a flexural rigidity, as determined in the aforesaid manner, lying in this latter range of values.

It will thus be seen that we have disclosed a non-metallic cordage product having a flexural rigidity making it suitable as a conduit cordage, even though elongated non-metallic articles are widely believed to be wholly impractical for the purpose set forth herein. Moreover, the practice of installing an electrical conductor in a conduit by using the non-metallic cordage product as a guide line following its introduction through the conduit offers results superior to those obtained by the commonly employed fish tape or snake wire without the undesirable characteristics accompanying the use of such fish tapes and snake wires. The novel non-metallic conduit cordage herein disclosed is non-conductive and not susceptible to rust or corrosion, while being light in weight, easy to grasp and feed into a conduit and also easy to grasp and pull a comparatively stiff elongated article, such as an electrical conductor, into a conduit after the non-metallic conduit cordage has been inserted through the length of the conduit. These qualities are accompanied by the strength, toughness, and durability of the non-metallic conduit cordage—its high fatigue resistance, excellent conformability in shape as required by the shape of the conduit with which it is used, and high degree of elastic recovery (exemplified by its ability to be tied in a tight overhand or figure-of-eight knot without undergoing permanent distortion)—leading to a long useful life therefor.

In the drawings and specification there has been set forth a preferred embodiment of the invention and, although specific terms are employed, they are used in a generic and descriptive sense only and not for purposes of limitation, the scope of the invention being defined in the claims.

We claim:

1. An elongated non-metallic guide line for insertion through a conduit, said guide line exhibiting a flexural rigidity sufficient to enable it to be inserted through conduits of extensive length and conduits having angular bends therein, the flexural regidity of said guide line being defined by the formula:

$$\text{Flexural rigidity} = \frac{Pl^3}{3y}$$

where:

the guide line is fixedly anchored at one end thereof and extended horizontally in space from the fixedly anchored end, with $P =$ force in dynes applied against the guide line at a distance $l$ in centimeters from the fixedly anchored end thereof to act in a vertically downward direction transverse to the horizontally extending length of the guide line, and $y =$ vertically downward deflection in centimeters of the guide line resulting from the application of the force P thereagainst and measured from the point of application of the force P;

and lying in the range of $4.3 \times 10^6$ to $3.27 \times 10^7$ dyne-centimeters².

2. An elongated non-metallic guide line for insertion through a conduit, said guide exhibiting a flexural rigidity sufficient to enable it to be inserted through conduits of extensive length and conduits having angular bends therein, the flexural rigidity of said guide line being defined by the formula:

$$\text{Flexural rigidity} = \frac{Pl^3}{3y}$$

where:

the guide line is fixedly anchored at one end thereof and extended horizontally in space from the fixedly anchored end, with $P =$ force in dynes applied against the guide line at a diance $l$ in centimeters from the fixedly anchored end thereof to act in a vertically downward direction transverse to the horizontally extending length of the guide line, and $y =$ vertically downward deflection in centimeters of the guide line resulting from the application of the force P thereagainst and measured from the point of application of the force P;

and lying in the range of $4.9 \times 10^6$ to $1.31 \times 10^7$ dyne-centimeters².

3. A guide line for insertion through a conduit comprising an elongated non-metallic cordage product having an outer flexible braided jacket possessing a relatively high tensile strength and low coefficient of friction, said jacket defining a tubular covering, and a rod extending through said jacket, said rod possessing less flexibility than said jacket to impart relative rigidity to the cordage product and defining a core within the tubular covering defined by said jacket, and said cordage product exhibiting a flexural rigidity sufficient to enable the cordage product to be inserted through conduits of extensive length and conduits having angular bends therein, the flexural rigidity of said cordage product being defined by the formula:

$$\text{Flexural rigidity} = \frac{P^3l}{3y}$$

where:

the guide line is fixedly anchored at one end thereof and extended horizontally in space from the fixedly anchored end, with $P =$ force in dynes applied against the guide line at a distance $l$ in centimeters from the fixedly anchored end thereof to act in a vertically downward direction transverse to the horizontally extending length of the guide line, and $y =$ vertically downward deflection in centimeters of the guide line resulting from the application of the force P thereagainst and measured from the point of application of the force P;

and lying in the range of $4.3 \times 10^6$ to $3.27 \times 10^7$ dyne-centimeters².

4. A guide line for insertion through a conduit comprising an elongated non-metallic cordage product having an outer flexible braided jacket possessing a relatively high tensile strength and low coefficient of friction, said jacket defining a tubular covering, and a rod extending through said jacket, said rod possessing less flexibility than said jacket to impart relative rigidity to the cordage product and defining a core within the tubular covering defined by said jacket, and said cordage product exhibiting a flexural rigidity sufficient to enable the cordage product to be inserted through conduits of extensive length and conduits having angular bends therein, the flexural rigidity of said cordage product being defined by the formula:

$$\text{Flexural rigidity} = \frac{Pl^3}{3y}$$

where:

the guide line is fixedly anchored at one end thereof and extended horizontally in space from the fixedly anchored end, with $P$ = force in dynes applied against the guide line at a distance $l$ in centimeters from the fixedly anchored end thereof to act in a vertically downward direction transverse to the horizontally extending length of the guide line, and $y$ = vertically downward deflection in centimeters of the guide line resulting from the application of the force P thereagainst and measured from the point of application of the force P;

and lying in the range of $4.9 \times 10^6$ to $1.31 \times 10^7$ dyne-centimeters².

References Cited in the file of this patent

UNITED STATES PATENTS

| | | |
|---|---|---|
| 1,243,337 | O'Connell | Oct. 16, 1917 |
| 1,858,997 | Lewin | May 17, 1932 |
| 1,946,037 | Scott | Feb. 6, 1934 |
| 2,413,642 | Mitchell | Dec. 31, 1946 |
| 2,712,263 | Crandell | July 5, 1955 |
| 2,750,152 | Schinske | June 12, 1961 |
| 2,975,512 | Somes | Mar. 21, 1961 |
| 2,983,037 | Hendrix | May 9, 1961 |

UNITED STATES PATENT OFFICE
CERTIFICATE OF CORRECTION

Patent No. 3,102,715                      September 3, 1963

Edward W. Weitzel et al.

It is hereby certified that error appears in the above numbered patent requiring correction and that the said Letters Patent should read as corrected below.

In the grant (only), line 14, for "Jet Line Products, Inc., its successors" read -- Jet Line Products, Inc., and Shuford Mills, Inc., their successors --; column 1, line 64, for "wirespread" read -- widespread --; column 3, line 30, for "jacketed" read -- jacket --; column 6, line 40, for "elongated" read -- elongate --; line 52, strike out "a"; same column 6, line 74, for "this" read -- the --; column 8, line 26, after "guide" insert -- line --; line 39, for "diance" read -- distance --; line 63, for "$P^31$" read -- $Pl^3$ --; column 10, line 21, for "1961" read -- 1956 --.

Signed and sealed this 11th day of February 1964.

(SEAL)
Attest:

ERNEST W. SWIDER                      EDWIN L. REYNOLDS
Attesting Officer                 Acting Commissioner of Patents